May 5, 1959

E. H. AYERS 2,885,016

CONTROL SYSTEM FOR ELECTRIC DRIVE VEHICLE
WITH AUXILIARY PUMP

Filed Sept. 22, 1953

INVENTOR.
EDGAR H. AYERS
BY Kenneth C. Witt
ATTY.

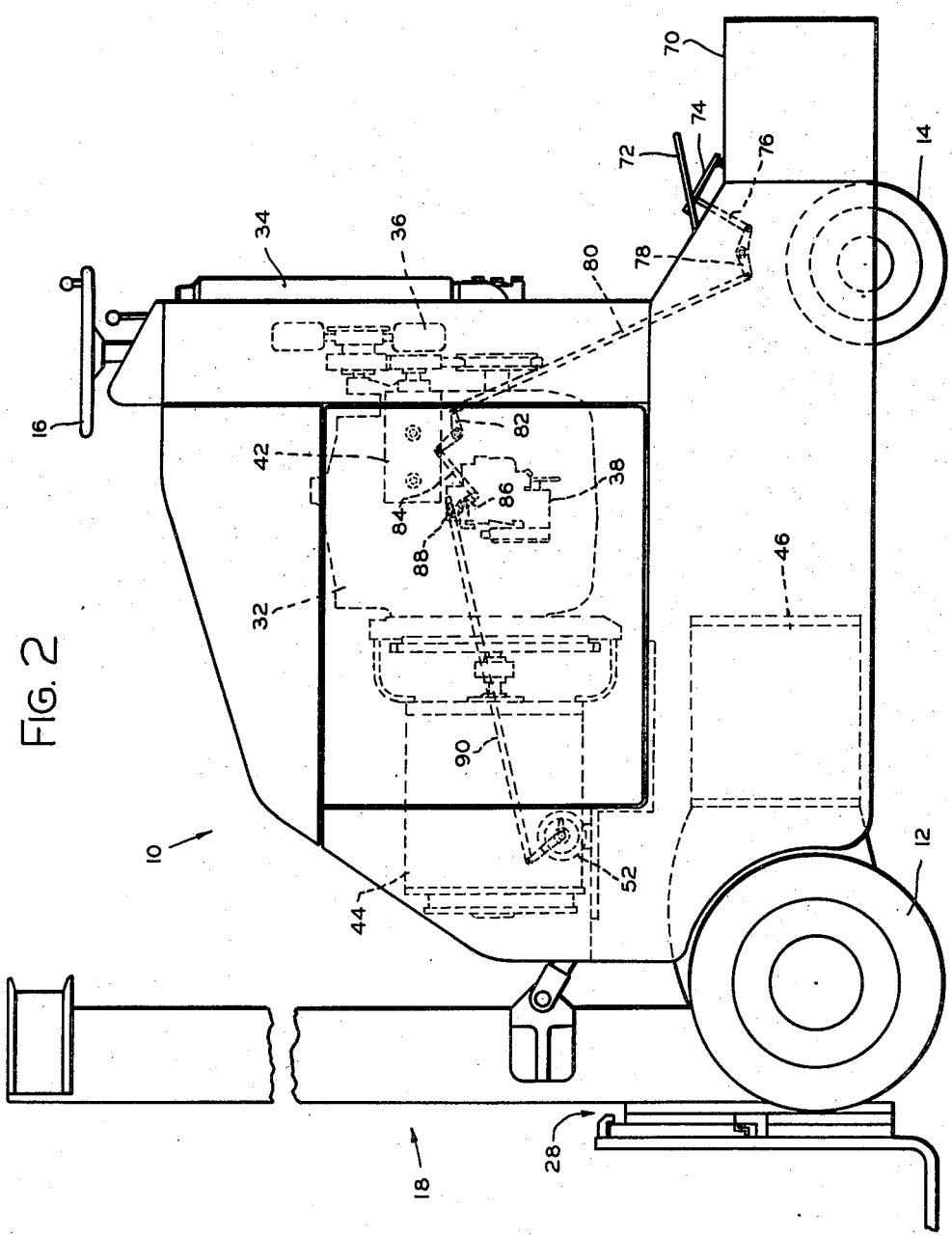

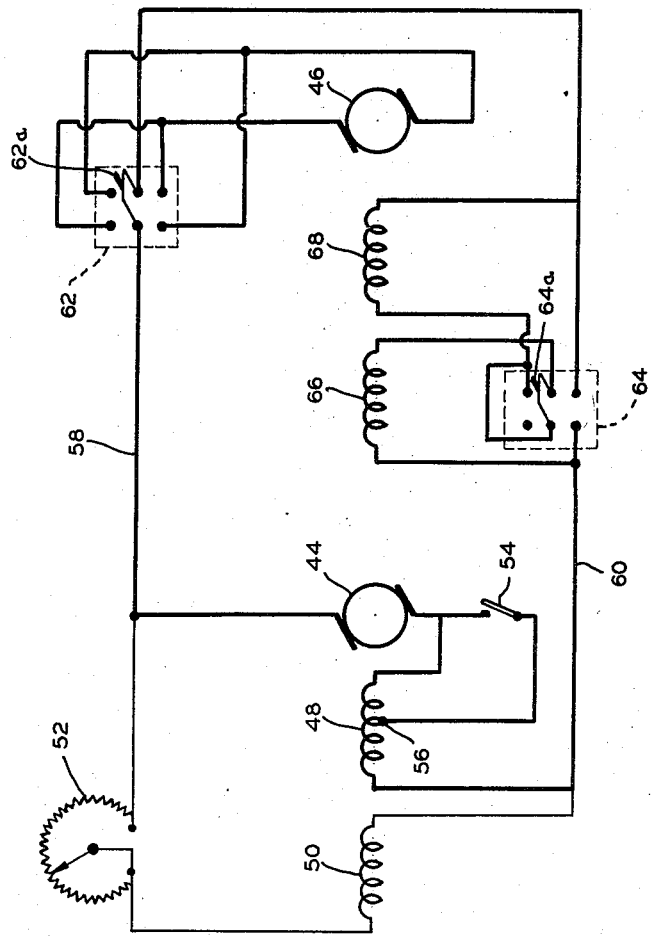

United States Patent Office 2,885,016
Patented May 5, 1959

2,885,016

CONTROL SYSTEM FOR ELECTRIC DRIVE VEHICLE WITH AUXILIARY PUMP

Edgar H. Ayers, Niles, Mich., assignor to Clark Equipment Company, a corporation of Michigan Application September 22, 1953, Serial No. 381,659

4 Claims. (Cl. 180—53)

This invention relates to control systems for vehicles such as industrial lift trucks which perform a plurality of operations such as transporting, lifting, and the like. More particularly, this invention relates to such vehicles which employ electric drive in the form of a generator driven by a prime mover and a motor connected to the generator and arranged to operate the drive wheels of the vehicle.

The principal object of my invention is to provide a simple control system for such a vehicle which provides a large degree of flexibility and ease in the operation of the vehicle.

A more specific object of my invention is to provide a control system for such a vehicle which provides for propelling the vehicle at varying speeds while simultaneously performing auxiliary operations with the vehicle.

Still more specifically, it is an object of my invention to provide such a control system which allows the vehicle to be propelled at a low speed while an auxiliary device operated by power derived from the same engine which propels the truck is operated at a high speed.

Other objects, features and advantages of my invention will be apparent in part and in part are pointed out in the subsequent description of a preferred embodiment of the invention.

In carrying out my invention in one form, I provide a control system for a vehicle which includes an engine, an electric generator driven by the engine, an electric motor connected to the generator for propelling the vehicle, and a pump driven by the engine for providing fluid pressure for the operation of fluid pressure operated devices on the vehicle. The control system includes a series field winding on the generator for providing a portion of the generator excitation, and means for selectively shunting a portion of the series field winding. This arrangement, because of the resulting reduced excitation of the generator when a portion of the series field is shorted, makes it possible to operate the engine, and the generator and pump driven by the engine, at high speeds in situations in which it is desirable to secure a high output from the pump but simultaneously to secure a low output from the generator.

Another aspect of my invention includes a control mechanism for operating the engine throttle and a field rheostat in the shunt field circuit of one of the electrical machines in sequence in order to provide desirable operating characteristics in a simple manner.

For a clearer and more complete understanding of my invention, reference should be had to the following detailed description of a preferred embodiment thereof in conjunction with the accompanying drawing.

In the drawing:

Fig. 2 is a side elevation view of the lift truck of Fig. 1.

Fig. 3 is a schematic diagram of the electrical circuit of the form of my invention described and illustrated herein.

Figure 1:
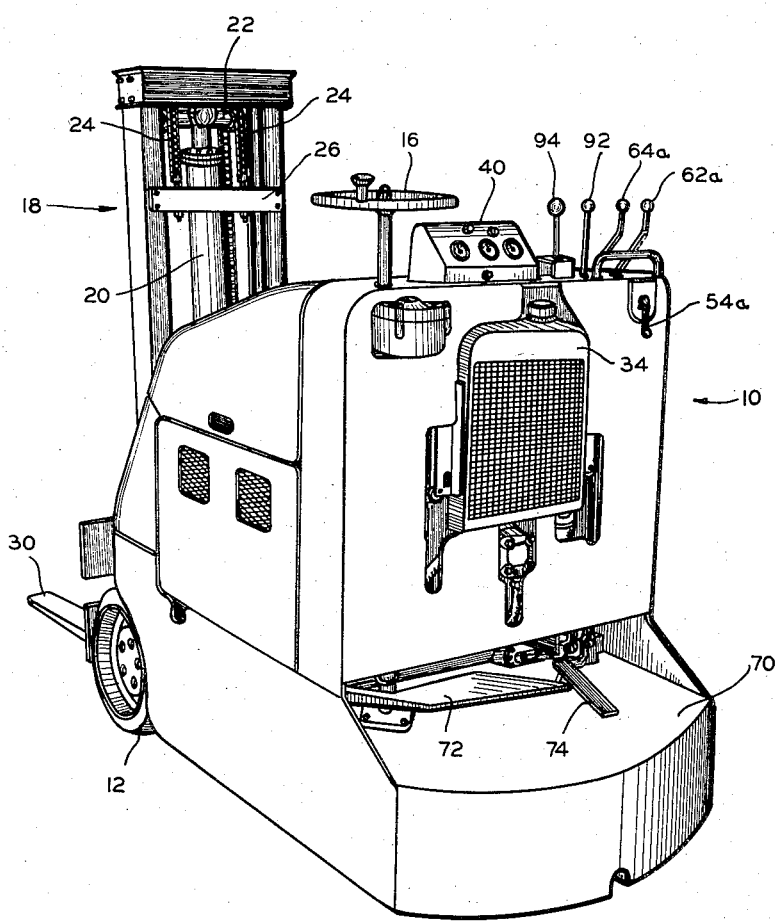
Fig. 1 is a perspective view of a typical lift truck embodying the control system of my invention.

In Figs. 1 and 2 of the drawing there is illustrated a stand-up rider-type lift truck which I have designated generally by the numeral 10. This machine has been chosen for purposes of illustration of my invention; however, it will be understood that my invention may be used also with other vehicles such as rider-type lift trucks, pedestrian-type lift trucks, and the like.

Vehicle 10 is provided with driving wheels 12 at the forward end and steering wheels 14 at the rear, the latter being connected by means of a conventional linkage (not shown) to a conventional operator's steering wheel 16.

At the front end of the truck 10 it is provided with a conventional telescoping mast assembly 18. The mast 18 includes an hydraulic cylinder 20 and a piston therein. A cross head 22 is carried by the piston. A pair of chains 24 are trained over suitable sprockets on the cross head, the chains being anchored at one end to a cross member 26 on the fixed portion of the mast and connected at the other end to a movable carriage 28, all in a conventional manner. A pair of forks 30, only one of which appears in the drawing, is mounted on the carriage.

As will be readily understood by those familiar with lift trucks, when fluid from a suitable source of fluid pressure within the machine 10 is admitted to the cylinder 20 it raises forks 30 to lift a load which may be positioned thereon.

To provide a source of power for propelling the vehicle and for operating forks 30, the machine 10 is provided with a prime mover 32 which in the typical truck illustrated herein is a gasoline engine. The engine includes conventional auxiliary devices such as a radiator 34 for the engine coolant, an air circulating fan 36 driven by the engine for blowing air through the radiator, and a carburetor 38. A gage panel 40 may be provided for mounting gages to indicate various engine operating conditions.

In addition, the engine 32 drives a pump 42 which supplies hydraulic fluid through suitable conventional connections (not shown) to the lift cylinder 20 for the operation of the forks 30. The engine 32 also is connected to and drives a generator 44. The generator 44 is connected through suitable electrical connections, which are shown schematically in Fig. 3, to a motor 46. The motor 46 is connected through suitable gears (not shown) to the drive wheels 12. Thus, it will be understood that the vehicle 10 may be propelled by operating engine 32 to drive generator 44, the generator supplying current to the motor 46 which operates the drive wheels.

In the operation of a truck such as machine 10 illustrated herein, it is customary to pick up a load on forks 30 by operating the hydraulic lifting mechanism and then transport the load a considerable distance on the truck to a point where the load is to be stored, for example, or otherwise disposed of. In such an operation, it is desirable, of course, to operate the truck at a relatively high speed when it is transporting the load. However, when the load has been transported to its destination, it is frequently necessary to raise the forks 30 to a considerable height and then deposit the load on a stack or tier at a considerable elevation from the floor. During such a raising operation it is desirable to operate the pump 42 at a relatively high speed. However, if the engine 32 is operated at a high speed in order to operate pump 42 at such a speed, then generator 44 will also be operated at high speed which will result in the generation of a relatively high voltage if normal excitation of this machine is maintained. I solve this problem by providing means for selectively reducing the excitation of generator 44 under these conditions so that it generates a low voltage. This permits the truck 10 to be moved at a relatively slow speed to get it in position for stacking a load, for example, while the load is simultaneously being lifted rapidly by the forks 30.

In order to understand how my invention provides for such operation reference should be had to the schematic electrical circuit diagram in Fig. 3. As shown in this figure, generator 44 is a compound wound machine having a series field winding 48 and a shunt field winding 50. A rheostat 52, which appears also in Fig. 2, is connected in circuit with the shunt field winding 50 in order to adjust the current in this winding. A switch 54 is connected between a tap 56 on series field winding 48 and one end of winding 48 whereby when switch 54 is closed a portion of the series field winding 48 is shunted. When the switch 54 is closed the portion of series field winding 48 which is shunted is not effective in producing excitation for machine 44 because this portion carries substantially no current under these conditions. The result of closing switch 54, therefore, is to reduce the excitation provided by winding 48.

Conductors 58 and 60 between the motor and the generator are connected respectively to a reversing switch 62 and a series-parallel switch 64. Switch 62 is connected to motor 46 in a manner such that when the switch is in the upper of the two positions illustrated the motor operates in one direction, and when the switch is in the lower of the two positions the motor operates in the opposite direction.

Motor 46 is provided with a series field winding which is in two sections, 66 and 68. These sections are connected to switch 64 in a manner such that when the switch is in the upper position the field winding sections 66 and 68 are connected in series, and when the switch 64 is in the lower position sections 66 and 68 are connected in parallel.

The operation previously discussed of propelling the truck 10 at a low speed while operating the engine at a high speed is achieved by closing switch 54. When this switch is opened, the generator 44 receives full excitation from series field winding 48 and therefore produces a relatively large voltage. When switch 54 is closed, however, the excitation produced by winding 48 is reduced to a fraction of the former excitation and the voltage output of generator 44 is therefore correspondingly reduced. Such a reduction in generator voltage reduces the voltage supplied to motor 46 and reduces the speed of the truck proportionately to the resulting reduction in the motor speed. Switch 54 may be in a convenient location on the truck as shown in Fig. 1 where the operator can readily operate this switch when the need arises.

On the truck 10 illustrated herein, the operator stands on a platform 70 at the rear of the truck where he can steer the machine by means of steering wheel 16 and operate the various controls which are located adjacent the operator's station. The large pedal 72 shown just above the platform 70 is the brake pedal, and in the truck illustrated this pedal is arranged so that the brake is released when the operator steps down on pedal 72. This provides a so-called dead-man control in that if the operator should fall from the truck and remove his foot from the pedal 72 the brake would be applied automatically.

The engine is controlled by means of an accelerator pedal 74 which also is located on the platform 70. The accelerator pedal 74 as shown in connected with the carburetor 38 by means of a linkage which includes a rod 76, a bell crank 78, a second rod 80, a second bell crank 82, a third rod 84, and a third bell crank 86. The accelerator pedal 74 operates the carburetor 38 in the conventional manner to admit more fuel as pedal 74 is depressed.

However, to facilitate operation of the truck and to avoid the necessity for using an additional control device, I also arrange rheostat 52 so that it is operated by pedal 74 sequentially with carburetor 38. The linkage is arranged so that the throttle is completely opened by only a portion of a stroke of pedal 74, or by a portion of the operating range of any other control device which may be used. Then by means of a lost motion connection indicated generally at 88 and a rod 90 I provide for the operation of rheostat 52 during the remainder of the stroke of pedal 74. The arrangement shown in Fig. 2 of the drawing is in part schematic, but it will be readily understood by those skilled in the art that linkage 88, 90 may be arranged in a conventional manner to operate rheostat 52 through its effective range sequentially with the operation of the engine throttle to its open position.

Rheostat 52 is connected in circuit with shunt field winding 50 in the conventional manner to regulate the current in shunt field winding 50 and thereby vary the amount of generator excitation provided by this field winding. Turning the arm of the rheostat clockwise as shown in Fig. 3 decreases the amount of resistance provided by rheostat 52 in circuit with the shunt field winding and thereby increases the amount of excitation provided by this field winding. Ordinarily, the linkage which operates the rheostat is arranged so that the rheostat remains in the extreme counter-clockwise position until the engine 32 is brought up to the optimum speed range by the operation of control device 74 in the first portion of its operating range. Then in the second portion of the operating range of control device 74 the rheostat 52 is turned clockwise to reduce its resistance and increase the generator output voltage. Such an increase in generator voltage increases the voltage applied to the motor and thereby increases the speed of the vehicle 10.

In order to provide still more flexibility in the operation of vehicle 10, the series field winding for the motor 46 may be divided into two sections, as illustrated by sections 66 and 68 in Fig. 3. When these sections are connected so that they may be operated either in series or parallel, as by switch 64 in Fig. 3, still further control of the speed of the vehicle may be had by the operation of switch 64. When switch 64 is in the upper position so that series winding sections 66 and 68 are connected in series, the motor 46 will operate in a lower speed range. When switch 64 is thrown to a lower position so that sections 66 and 68 are connected in parallel the excitation of the motor 46 will be weakened which will result in the operation of the motor in a higher speed range.

As will be readily understood, switches 62 and 64 ordinarily are located adjacent the operator's station on the truck so as to be readily accessible, and I have indicated on Fig. 1 two handles which may be used for operating these switches, these handles bearing respectively identifying numerals 62a and 64a. Other handles such as 92 and 94 in Fig. 1 may be used for such purposes as operating the hydraulic lifting mechanism for forks 30 and for operating a tilting mechanism for mast 18.

From the foregoing it will be apparent that my invention provides a control system for vehicles which is easy to operate but which at the same time provides great flexibility. This control system is particularly adaptable for use with vehicles such as lift trucks which perform other operations in addition to transporting goods, because it provides for rapid speeds for traveling but also provides for low speeds while maneuvering and simultaneously performing another operation such as lifting a load.

While I have illustrated and described herein a preferred embodiment of my invention, it will be apparent that modifications of my invention may be made. For example, instead of using rheostat 52 in circuit with the shunt field winding of the generator, it would be possible to make motor 46 a compound wound machine having a shunt as well as a series field winding. Then a rheostat could be connected in circuit with this motor shunt field winding to accomplish the same result as rheostat 52 in circuit with the generator shunt field winding. It is well known that weakening the motor field is the equivalent of strengthening the generator field; this well-known principle could be taken advantage of in this situation by arranging a motor shunt field rheostat to weaken the motor field when greater speed is desired. Such a motor field rheostat could be operated sequentially with the throttle in the same manner as the generator field rheostat.

In a similar manner other field windings may be located on either of the electric machines merely by selecting the proper sense of operation for such windings.

Other modifications of my invention likewise may be made. Accordingly, it should be understood that I intend to cover by the appended claims all such modifications which fall within the true spirit and scope of my invention.

What I claim as new and desire to secure by Letters Patent of the United States is:

1. A control system for a vehicle which includes an engine, an electric generator driven by the engine for providing power for propelling the vehicle, an electric motor connected to the generator for operating the drive wheels of the vehicle, and a pump driven by the engine for providing fluid pressure for the operation of a fluid pressure operated device on the vehicle, the control system comprising a series field winding on the generator for providing at least a portion of the generator excitation, selective means for shunting at least a portion of the said series field winding, a control device having a predetermined operating range, the said control device being arranged to vary the speed of the engine when operated in one portion of its said range, a shunt field winding on one of the electric machines, means for varying the current in the said shunt field winding, and means whereby the said control device when operated in another portion of its said range operates the said shunt field current varying means.

2. A control system for a vehicle which includes an engine, an electric generator driven by the engine for providing power for propelling the vehicle, an electric motor connected to the generator for operating the vehicle drive wheels, and auxiliary means driven by the engine providing for the operation of an auxiliary device on the vehicle, the control system comprising an excitation winding on a first of the electrical machines, selective means for shunting at least a portion of the said excitation winding, a control device having a predetermined operating range, the said control device being arranged to vary the speed of the engine when operated in one portion of its said range, means for varying the excitation current of one of the electrical machines, and means whereby the said control device when operated in another portion of its said range operates the said excitation current varying means.

3. A control system for a vehicle which includes an engine, an electric generator driven by the engine for providing power for propelling the vehicle, an electric motor connected to the generator for operating the drive wheels of the vehicle, and auxiliary means driven by the engine providing for the operation of auxiliary devices on the vehicle, the control system comprising an excitation winding on a first of the electrical machines for providing at least a portion of the excitation for such first machine, selective means for shunting at least a portion of the said excitation winding, a control device having a predetermined operating range, the said control device being arranged to vary the speed of the engine when operated in one portion of its said range, a second excitation winding on one of the electrical machines, means for varying the current in the said second excitation winding, and means whereby the said control device when operated in another portion of its said range operates the said current varying means for the second excitation winding.

4. A control system for a lift truck which includes an internal combustion engine, an electric generator driven by the engine for providing power for propelling the lift truck, an electric motor connected to the generator for operating the drive wheels of the lift truck, and a pump driven by the engine for providing hydraulic pressure for the operation of hydraulic pressure operated auxiliary devices on the lift truck, the control system comprising a series field winding on the generator for providing a portion of the generator excitation, selective means for shunting a portion of the said series field winding, an accelerator pedal device having a predetermined operating range, the said accelerator pedal device being arranged to operate the engine throttle between closed and open positions when operated in one portion of its said range, a shunt field winding on the generator for providing another portion of the generator excitation, rheostat means in circuit with the said shunt field winding for varying the current therein, linkage means for operating the said rheostat means when the said accelerator pedal device is operated in another portion of its said range, an excitation winding for the motor divided into two sections, a switch for connecting the said sections selectively in series and parallel, and an additional switch for selectively reversing the connections between the generator and motor to provide for the operation of the lift truck in either direction.

References Cited in the file of this patent
UNITED STATES PATENTS

| | | |
|---|---|---|
| 1,216,237 | Lemp | Feb. 13, 1917 |
| 1,585,351 | Ionides | May 18, 1926 |
| 1,745,532 | Fuller | Feb. 4, 1930 |
| 1,799,096 | Guernsey | Mar. 31, 1931 |
| 2,434,413 | Justus | Jan. 13, 1948 |
| 2,653,841 | Davies et al. | Sept. 29, 1953 |